July 3, 1956

H. M. LESSER 2,753,064

TRAILER TILTABLE ON LONGITUDINALLY SHIFTABLE AXLE MOUNTING

Filed April 5, 1955

INVENTOR.

HAROLD M. LESSER

BY Bertha L. MacGregor
ATTORNEY

July 3, 1956  H. M. LESSER  2,753,064
TRAILER TILTABLE ON LONGITUDINALLY SHIFTABLE AXLE MOUNTING
Filed April 5, 1955  2 Sheets-Sheet 2

INVENTOR.
HAROLD M. LESSER
BY Bertha L. MacGregor
ATTORNEY

2,753,064

TRAILER TILTABLE ON LONGITUDINALLY SHIFTABLE AXLE MOUNTING

Harold M. Lesser, Golden, Colo.

Application April 5, 1955, Serial No. 499,380

7 Claims. (Cl. 214—506)

This invention relates to vehicles which are provided with load carrying beds which are tiltable on longitudinally shiftable axle mountings.

The main object of the invention is to provide a trailer or truck bed assembly provided with a power operated, longitudinally shiftable axle mounting which supports the bed assembly in horizontal position for transportation of a load, and which supports the bed in tilted, rear end ground engaging position for loading of the bed.

Another object of the invention is to provide antifriction means for the axle mounting on the vehicle bed, whereby the axle mounting can be shifted easily relatively to said bed.

These and other objects and advantages will appear from the drawings and the following specification.

Figure 1:
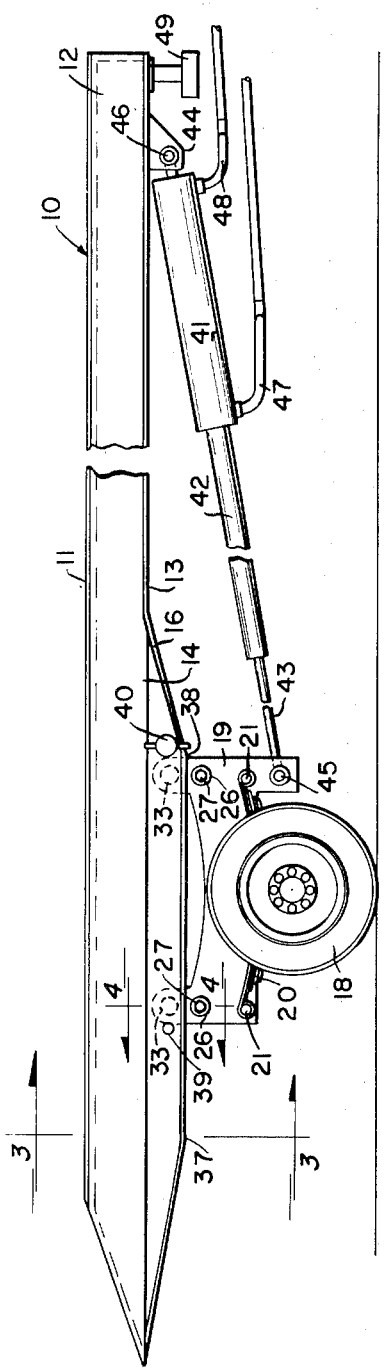
Fig. 1 is a side elevational view of a trailer embodying my invention, showing the bed in horizontal position.

In the preferred embodiment of my invention shown in the drawings, 10 indicates a trailer bed which comprises a flat platform 11, reinforcing side rails 12, bottom 13, and a pair of parallel, spaced part, longitudinally extending tracks each consisting of two beams 14. The two beams 14 of each track may be I-beams separately rigidly secured to the lower side of the bed platform 11, or they may be formed as a unit having one top plate 15 secured to the bed platform as shown. In either case, the lower proximate flanges 16 of the I-beams of each track are spaced apart transversely of the truck or trailer bed a distance slightly greater than the transverse thickness of the axle mounting which will be described hereinafter.

A conventional wheel axle is indicated at 17 and wheels at 18.

Figure 3:
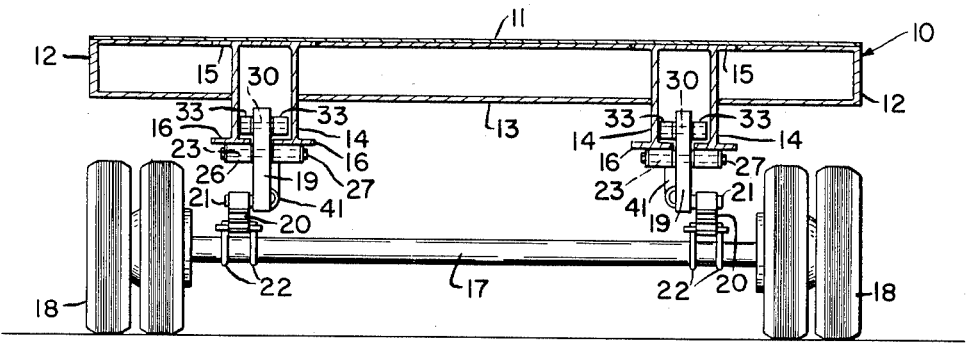
Fig. 3 is a transverse vertical sectional view in the plane of the line 3—3 of Fig. 1.
Figure 4:
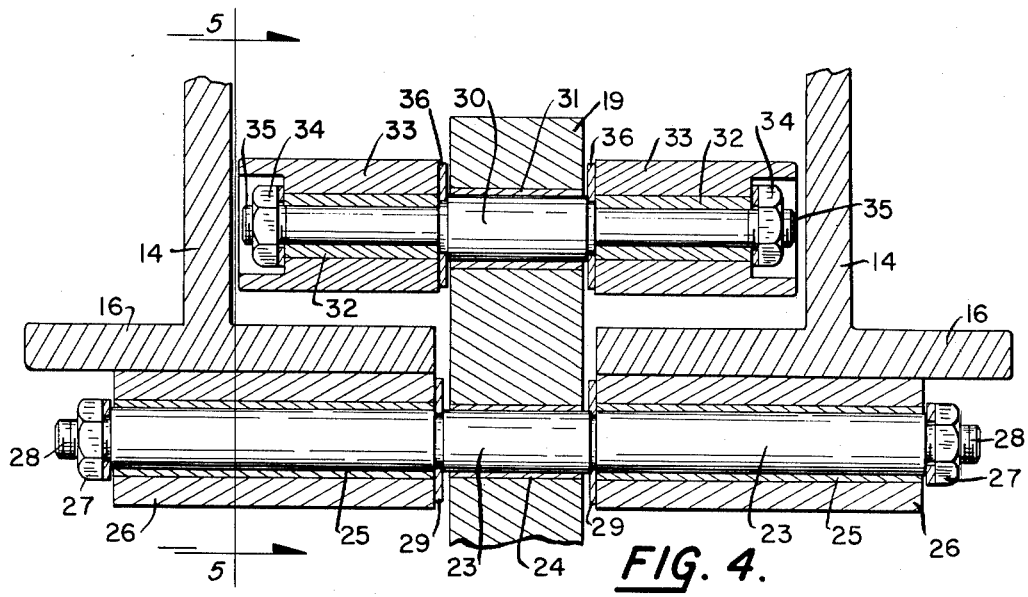
Fig. 4 is a transverse vertical sectional view, on an enlarged scale, of part of the axle mounting, in the plane of the line 4—4 of Fig. 1.
Figure 5:
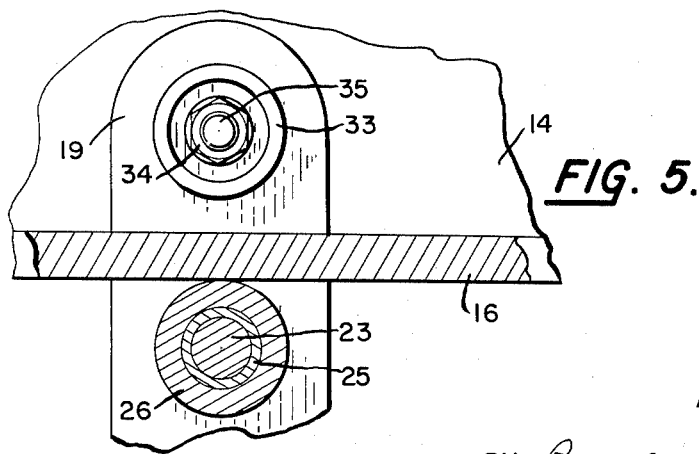
Fig. 5 is a longitudinal vertical sectional view in the plane of the line 5—5 of Fig. 4.

The axle mounting of my invention comprises two frames 19, one at each side of the vehicle, extending longitudinally of the bed 10. Each frame has mounted on its outer side a leaf spring 20 by pins 21. The spring 20 is connected, near its center, to the axle 17 by any suitable means such as brackets or straps 22. The upper portion of each frame 19 extends upwardly into the space between the two I-beams forming one of the two tracks. On the upper portion of each frame 19, as best shown in Figs. 3 and 4, are rotatably mounted four sets of roller bearings. Each lower set comprises a horizontal shaft 23, bushings 24 and 25, rollers 26, and nuts 27 on the reduced threaded ends 28 of the shaft 23. The shaft 23 is annularly grooved between that portion mounted in the frame 19 and the portions on which the rollers 26 are mounted, and washers 29 are retained in the grooves adjacent the inner ends of the rollers 26. Each upper set of roller bearings comprises a horizontal shaft 30, bushings 31, 32, rollers 33, nuts 34 on the reduced threaded ends 35 of the shaft 33, and washers 36 on the shaft adjacent the inner ends of the rollers 33. The rollers 33 are axially recessed at their outer ends to accommodate the nuts 34.

The lower rollers 26 bear against the lower surface of the flanges 16 of the I-beams 14, and transmit the weight of the bed 10 through the frame 19 to the axle 17. The upper rollers 33 serve as retaining or guide rollers for the shiftable axle mounting unit, above the flanges 16 and between the vertical portions of the I-beams 14.

Figure 2:
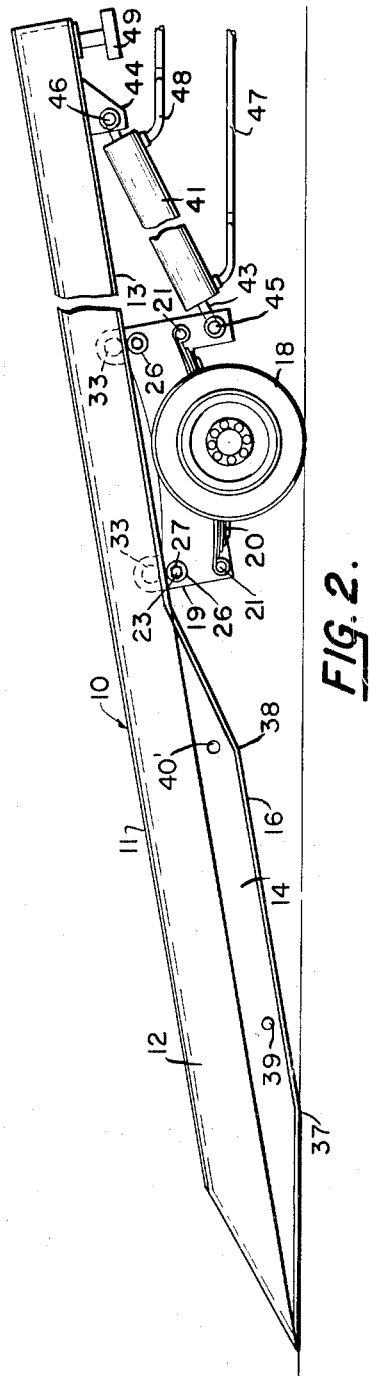
Fig. 2 is a view similar to Fig. 1, showing the bed in tilted, rear end ground engaging position.

Preferably I employ the described sets of bearing rollers 26 and guide rollers 33 at both the forward and rearward ends of the frame 19, as best shown in Figs. 1 and 2.

I have shown and described the shafts 23 and 30 as rotatable in bushings in the frame 19, and the rollers 26 and 33 as rotatable with the shafts, but obviously the rollers may be independently rotatable also on their respective shafts to insure against binding. The construction shown is practical for assembly purposes and also for replacement of the rollers in the event of wear.

By reference to Figs. 1 and 2, it will be understood that the height of the I-beams 14 forming the two tracks under the bed platform 11 is not uniform. The beams are greater in height in the rearward portion between the points designated 37 and 38 on Fig. 2, than near the forward end of the bed. The lower flanges 16 are parallel to the bed 10 and the I-beams 14 have their greatest depth in said part between the points 37 and 38. The flanges 16 are inclined longitudinally upwardly and rearwardly from the point 37, and inclined longitudinally upwardly and forwardly from the point 38, and parallel to the bed 10 at the forward end of the structure. The purpose of this construction will be apparent from a comparison of Figs. 1 and 2, which show that the bed 10 is in horizontal position when the wheels 18 and axle mounting 19 are located between the stop pin 39 and safety pin 40 (Fig. 1) between said points 37 and 38. Said bed is in tilted, downwardly and rearwardly inclined position, with the rear end track portion in ground contacting position, when the wheels and axle mounting have been moved longitudinally forwardly to the portion of the track which is reduced in height near the front end of the bed.

The hole for receiving the safety pin 40 is indicated at 40'. The pin is removed when it is desired to move the axle mounting forwardly for allowing the bed 10 to be tilted, and is replaced when the bed is in horizontal position and ready for travel.

The means for shifting the axle mounting and wheels longitudinally of the bed 10 comprises a power cylinder 41, such as a hydraulic cylinder, and telescopic piston rods 42, 43. The rod 43 is pivotally connected at 45 to the frame 19 of the axle mounting, and the cylinder 41 is pivotally connected at 46 to a depending portion 44 of the track beams 14. Conduits 47 and 48 communicate with the cylinder 41 and carry the hydraulic fluid to and from the cylinder from a source (not shown) carried by the power unit of the motor vehicle.

The coupling 49 at the front end of the bed 10 connects the trailer to a power unit (not shown). It will be understood that the axle mounting, tracks and means for moving the axle mounting may be installed under the bed of a truck instead of the trailer shown in the drawings.

In describing the invention, reference has been made to a particular example embodying the same, but I wish it to be understood that the invention is not limited to the construction shown in the drawing and that various changes may be made in the construction and general arrangement of parts without departing from the invention.

I claim:

1. A vehicle provided with a bed which is tiltable on a longitudinally shiftable axle mounting, comprising a load carrying bed, a track extending longitudinally adjacent each side of the bed and rigidly secured to the lower side of the bed, lower flanges on the track spaced from and parallel to the vehicle bed in two longitudinal sections of the track, the forwardly located flange section being spaced from the bed a distance less than the distance between the bed and the rearwardly located flange section, said rearward flange section terminating in an upwardly and rearwardly inclined end portion which is ground contacting when the bed is in tilted position, a wheel axle extending transversely of the bed, a pair of axle mounting frames, means connecting said frames to the axle in transversely spaced relationship, means shiftably mounting said frames on the track flanges, and power means connected to an axle mounting frame and bed for moving the frame and axle longitudinally relatively to the bed.

2. The vehicle defined by claim 1, which includes a stop pin in the rearward portion of a track limiting the rearward movement of an axle mounting frame, and a safety pin removably mounted in the track a distance forwardly of said stop pin substantially equal to the length of the frame.

3. The vehicle defined by claim 1, in which the power means comprises an hydraulic cylinder pivotally connected to the bed, and a piston rod telescopically mounted in the cylinder and pivotally connected at its free end to an axle mounting frame.

4. A vehicle provided with a bed which is tiltable on a longitudinally shiftable axle mounting, comprising a load carrying bed, a track extending longitudinally adjacent each side of the bed and rigidly secured to the lower side of the bed, each track comprising a pair of transversely spaced apart beams forming a channel between them, lower flanges on the track spaced from the vehicle bed, a wheel axle extending transversely of the bed, a pair of axle mounting frames, means connecting said frames to the axle in transversely spaced relationship, each frame extending upwardly into the channel between the beams of a track, a horizontally transversely disposed shaft extending through each axle mounting frame, bearing rollers on said shaft at opposite sides of the axle mounting frame between the axle and the track beams in flange contacting relationship, a second horizontal shaft extending through each axle mounting frame, guide rollers rotatably mounted on said second shaft on opposite sides of the frame within the channel formed by the track beams above the lower flanges, and power means connected to an axle mounting frame and bed for moving the frame and axle longitudinally relatively to the bed.

5. A vehicle provided with a bed which is tiltable on a longitudinally shiftable axle mounting, comprising a load carrying bed, a track extending longitudinally adjacent each side of the bed and rigidly secured to the lower side of the bed, each track comprising a pair of transversely spaced apart beams forming a channel between them, lower flanges on the track spaced from and parallel to the vehicle bed in two longitudinal sections of the track, the forwardly located flange section being spaced from the bed a distance less than the distance between the bed and the rearwardly located flange section, said rearward flange section terminating in an upwardly and rearwardly inclined end portion which is ground contacting when the bed is in tilted position, a wheel axle extending transversely of the bed, a pair of axle mounting frames, means connecting said frames to the axle in transversely spaced relationship, each frame extending upwardly into the channel between the beams of a track, a horizontally transversely disposed shaft extending through each axle mounting frame, bearing rollers on said shaft at opposite sides of the axle mounting frame between the axle and the track beams in flange contacting relationship, a second horizontal shaft extending through each axle mounting frame, guide rollers rotatably mounted on said second shaft on opposite sides of the frame within the channel formed by the track beams above the lower flanges, and power means connected to an axle mounting frame and bed for moving the frame and axle longitudinally relatively to the bed.

6. The vehicle defined by claim 5, which includes a stop pin in the rearward portion of a track beam limiting the rearward movement of an axle mounting frame, and a safety pin removably mounted in the track beam a distance forwardly of said stop pin substantially equal to the length of the frame.

7. The vehicle defined by claim 5, in which the power means comprises an hydraulic cylinder pivotally connected to the bed, and a piston rod telescopically mounted in the cylinder and pivotally connected at its free end to an axle mounting frame.

References Cited in the file of this patent

UNITED STATES PATENTS

| | | |
|---|---|---|
| 2,284,661 | Joy | June 2, 1942 |
| 2,609,953 | Schramm | Sept. 9, 1952 |
| 2,717,707 | Martin | Sept. 13, 1955 |

FOREIGN PATENTS

| | | |
|---|---|---|
| 327,214 | Great Britain | Apr. 3, 1930 |
| 726,877 | France | Mar. 14, 1932 |